(12) United States Patent
Zhang et al.

(10) Patent No.: US 11,113,581 B2
(45) Date of Patent: Sep. 7, 2021

(54) INFORMATION PROCESSING METHOD AND INFORMATION PROCESSING APPARATUS

(71) Applicant: FUJITSU LIMITED, Kawasaki (JP)

(72) Inventors: Meng Zhang, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 16/450,153

(22) Filed: Jun. 24, 2019

(65) Prior Publication Data

US 2019/0392248 A1 Dec. 26, 2019

(30) Foreign Application Priority Data

Jun. 25, 2018 (CN) .......................... 201810662632.2

(51) Int. Cl.
*G06K 9/62* (2006.01)
*G06N 3/08* (2006.01)

(52) U.S. Cl.
CPC ........... *G06K 9/628* (2013.01); *G06K 9/6256* (2013.01); *G06N 3/08* (2013.01)

(58) Field of Classification Search
CPC .... G06K 9/628; G06K 9/6281; G06K 9/6282; G06K 9/6284; G06K 9/6256; G06K 9/6257; G06K 9/6259; G06K 9/6255
USPC .................................. 382/155–161, 224–228
See application file for complete search history.

(56) References Cited

U.S. PATENT DOCUMENTS

| 2011/0289030 | A1* | 11/2011 | Lu .......................... | G16H 50/70 706/14 |
|---|---|---|---|---|
| 2015/0030238 | A1* | 1/2015 | Yang ...................... | G06K 9/627 382/159 |

(Continued)

FOREIGN PATENT DOCUMENTS

GB 2555192 A * 4/2018 ........... G06N 3/0454

OTHER PUBLICATIONS

Gusarev, Maxim, et al. "Deep learning models for bone suppression in chest radiographs." 2017 IEEE Conference on Computational Intelligence in Bioinformatics and Computational Biology (CIBCB). IEEE, 2017. (Year: 2017).*

(Continued)

*Primary Examiner* — Claire X Wang
*Assistant Examiner* — Stephen M Brinich
(74) *Attorney, Agent, or Firm* — Staas & Halsey LLP (57) ABSTRACT

The present disclosure relates to an information processing method and an information processing apparatus. The information processing method according to the present disclosure performs training on a classification model by using a plurality of training samples, and comprises the steps of: adjusting a distribution of feature vectors of the plurality of training samples in a feature space based on a typical sample in the plurality of training samples; and performing training on the classification model by using the adjusted feature vectors of the plurality of training samples. Through the technology according to the present disclosure, it is possible to perform pre-adjustment on training samples before training, such that it is possible to reduce discrimination between training samples belonging to a same class and increase discrimination between training samples belonging to different classes in the training process. The classification model trained as such is capable of performing accurate classification on samples acquired under an extreme condition.

10 Claims, 4 Drawing Sheets

(56) References Cited

U.S. PATENT DOCUMENTS

2017/0308790 A1* 10/2017 Nogueira dos Santos ................. G06N 3/0454
2019/0318757 A1* 10/2019 Chen ....................... G10L 17/04

OTHER PUBLICATIONS

Yang, Wei, et al. "Cascade of multi-scale convolutional neural networks for bone suppression of chest radiographs in gradient domain." Medical image analysis 35 (2017): 421-433. (Year: 2017).*
Extended European Search Report dated Oct. 22, 2019 in related European Patent Application No. 19179144.1 (7 pages).
Wen Yandong et al; "*A Discriminative Feature Learning Approach for Deep Face Recognition*"; Sep. 16, 2016; International Conference on Computer Analysis of Images and Patterns; CAIP 2017: Computer Analysis of Images and Patterns; Lecture Notes in Computer Science; Lect. Notes Computer, Springer, Berlin, Heidelberg, pp. 499-515, XP047355154; ISBN: 978-3-642-17318-9 (retrieved on Sep. 16, 2016); (17 pages).
Bowen Wu et al; "*Exponential Discriminative Metric Embedding in Deep Learning*"; arxiv.org, Cornell University Library, 201 Olin Library Cornell University Ithaca, NY 14853, Mar. 7, 2018; XP080858558; (31 pages).
Hu Guosheng et al; "*When Face Recognition 1-10 Meets with Deep Learning: An Evaluation of Convolutional Neural Networks for Face Recognition*"; 2015 IEEE International Conference on Computer Vision Workshop (ICCVW); IEEE; Dec. 7, 2015; pp. 384-392; XP032864988; DOI: 10.1109/ICCVW.2015.58 (retrieved on Feb. 11, 2016) 2.2 Metric Learning; (9 pages).

* cited by examiner

INFORMATION PROCESSING METHOD AND INFORMATION PROCESSING APPARATUS

CROSS-REFERENCE TO RELATED APPLICATIONS

This application claims the priority benefit of Chinese Patent Application No. 201810662632.2, filed on Jun. 25, 2018 in the China National Intellectual Property Administration, the disclosure of which is incorporated herein in its entirety by reference.

FIELD OF THE INVENTION

Embodiments of the present disclosure relate to an information processing method and an information processing apparatus. In particular, embodiments of the present disclosure relate to an information processing method and an information processing apparatus which perform training on a classification model by using a plurality of training samples.

BACKGROUND

The development of a depth learning method of Convolutional Neural Networks (CNNs) and the construction of a large-scale database with a large number of labeled face images make the performance of face recognition greatly improved. For face images acquired under an extreme condition where there are great changes in aspects such as angle of view, resolution, occlusion, image quality and so on, however, face recognition based on convolutional neural networks still cannot achieve a relatively high accuracy.

Softmax function, as a classification model, has been widely applied in convolutional neural networks. In this case, Softmax loss function is used for training of convolutional neural networks. However, a convolutional neural network trained using the current Softmax loss function is only adapted for recognizing face images with high-quality data, but cannot achieve a satisfactory effect for recognition of face images acquired under an extreme condition.

Therefore, it is necessary to improve the existing Softmax loss function, so as to make it possible to perform accurate recognition on face images acquired under an extreme condition.

SUMMARY OF THE INVENTION

A brief summary of the present disclosure is given below to provide a basic understanding of some aspects of the present disclosure. It should be understood that the summary is not exhaustive; it does not intend to define a key or important part of the present disclosure, nor does it intend to limit the scope of the present disclosure. The object of the summary is only to briefly present some concepts, which serves as a preamble of the detailed description that follows.

An object of the present disclosure is to provide an information processing method and an information processing apparatus. By the information processing method and the information processing apparatus according to the present disclosure, training is performed on a classification model by using a plurality of labeled training samples, so as to obtain a classification model capable of performing accurate classification on samples acquired under an extreme condition.

To achieve the object of the present disclosure, according to an aspect of the present disclosure, there is provided an information processing method, which performs training on a classification model by using a plurality of training samples, the method comprising: adjusting a distribution of feature vectors of the plurality of training samples in a feature space based on a typical sample in the plurality of training samples; and performing training on the classification model by using the adjusted feature vectors of the plurality of training samples.

According to another aspect of the present disclosure, there is provided an information processing apparatus, which performs training on a classification model by using a plurality of training samples, the apparatus comprising: an adjusting unit to adjust a distribution of feature vectors of the plurality of training samples in a feature space based on a typical sample in the plurality of training samples; and a learning unit to perform training on the classification model by using the adjusted feature vectors of the plurality of training samples.

According to still another aspect of the present disclosure, there is provided an information processing method, which comprises detecting data to be detected, by using a classification model obtained by performing training by the information processing methods according to the above aspects of the present disclosure.

According to yet another aspect of the present disclosure, there is further provided a computer program capable of implementing the above information processing methods. Moreover, there is further provided a computer program product in at least computer readable medium form, which has recorded thereon computer program code for implementing the above information processing methods.

By performing training on a classification model by using a plurality of training samples through the technology according to the present disclosure, it is possible to realize an improvement in the classification model without significantly increasing calculation costs. In comparison with traditional classification models, it is possible to perform accurate classification on samples acquired under an extreme condition, through the classification model trained by the information according method according to the present disclosure. That is, the technology according to the present disclosure can guide a model to learn training samples with relatively high discrimination.

BRIEF DESCRIPTION OF THE DRAWINGS

The above and other objects, features and advantages of the present disclosure will be understood more easily with reference to the descriptions of embodiments of the present disclosure combined with the drawings below. In the drawings.

DETAILED DESCRIPTION OF THE INVENTION

Hereinafter, some embodiments of the present disclosure will be described in detail with reference to the appended illustrative diagrams. In denoting elements in figures by reference signs, identical elements will be denoted by identical reference signs although they are shown in different figures. Moreover, in the descriptions of the present disclosure below, detailed descriptions of known functions and configurations incorporated into the present disclosure will be omitted while possibly making the subject matter of the present disclosure unclear.

It should also be noted herein that, to avoid the present disclosure from being obscured due to unnecessary details, only those device structures and/or processing steps closely related to the solution according to the present disclosure are shown in the drawings, while omitting other details not closely related to the present disclosure.

Herein, although embodiments of the present disclosure are described under the background of applying Softmax function as a classification model to Convolutional Neural Networks (CNNs) to perform face recognition, the present disclosure is not limited to this. Under the teaching of the present disclosure, those skilled in the art could envisage expanding the inventive idea of the present disclosure to other classification models (such as Sigmoid function and Tan h function) and other application fields (such as speech recognition), and all of these variant solutions should be covered within the scope of the present disclosure.

As a classification model, Softmax function may be understood as a combination of a (max) function taking a maximum value from among a plurality of values with a probability of each value of the plurality of values to be taken as a maximum value. Softmax function, as an activation function, has been widely applied in various artificial neural networks.

A convolutional neural network is a feedforward artificial neural network, and has been widely applied to the field of image and speech processing. The convolutional neural network is based on three important features, i.e., receptive field, weight sharing, and pooling.

The convolutional neural network assumes that each neuron has a connection relationship with only neurons in an adjacent area and they produce influence upon each other. The receptive field represents a size of the adjacent area. In addition, the convolutional neural network assumes that connection weights between neurons in a certain area may also be applied to other areas, namely weight sharing. The pooling of the convolutional neural network refers to a dimension reduction operation performed based on aggregation statistics when the convolutional neural network is used for solving the problem of classification.

Softmax function is used for mapping an output of the convolutional neural network to an interval [0, 1], to represent a probability of input data to belong to a corresponding class, and thus is regarded as a classification model.

In a training process of the convolutional neural network, it is necessary to calculate a difference between a forward propagation result of the convolutional neural network and a result calculated with labeled training samples, and to use the difference as a loss to perform back propagation of the convolutional neural network, so as to perform training on the convolutional neural network. In a case where Softmax function is used in a pooling operation, Softmax loss function is used for performing learning of weights of the convolutional neural network.

To be specific, Softmax loss function is in the form as shown by the following equation (1).

$$L_{soft\,max} = \frac{1}{N}\sum_{i=1}^{N}\log\left(\frac{e^{W_{y_i}^T x_i + b_{y_i}}}{\sum_{j=1}^{C} e^{W_j^T x_i + b_j}}\right) \quad \text{Equation (1)}$$

$L_{softmax}$ represents a loss of Softmax function, which is defined as a cross entropy. N represents the number of characterized training samples $x_i$ ($1 \le i \le N$), and C represents the count of classes. Note that, the expression "training sample" in the present disclosure refers to a sample used to perform training on a classification model, i.e., a labeled sample; for example, training samples $x_i$ are labeled as $y_i$. Herein, the characterized training samples $x_i$ are M-dimensional vectors, and are labeled as $y_i$ which is a certain class of the C classes.

W and b represent a C*M-dimensional weight matrix and a C-dimensional bias vector of the convolutional neural network, respectively. $W_j$ ($1 \le j \le C$) represents a weight vector corresponding to a j-th class of the C classes in the weight matrix, and may be understood as parameters corresponding to the j-th class which serve as M-dimensional vectors.

The following equation (2) could be obtained by performing further transformation on the equation (1).

$$L_{soft\,max} = \frac{1}{N}\sum_{i=1}^{N}\log\left(\frac{e^{\|W_{y_i}^T\|\|x_i\|\cos(\theta_{y_i,i})+b_{y_i}}}{\sum_{j=1}^{C} e^{\|W_j^T\|\|x_i\|\cos(\theta_{j,i})+b_j}}\right) \quad \text{Equation (2)}$$

Where $\|W_{y_i}^T\|$ and $\|W_j^T\|$ represent moduli of M-dimensional weight vectors, $\|x_i\|$ represents a modulus of an M-dimensional training sample vector, $\theta_{j,i}$ represents an included angle between the weight vector $W_j$ and the training sample vector $x_i$ in a vector space, where $0 \le \theta_{j,i} \le \pi$.

Softmax function and its loss function $L_{softmax}$ are well-known to those skilled in the art, and thus no description thereof will be made in more details. However, those skilled in the art should appreciate that, although the present disclosure describes embodiments of the present disclosure based on Softmax function and its loss function $L_{softmax}$, the idea of the present disclosure may also be applied to other classification models, and may be applied to other artificial neural networks other than convolutional neural networks, such as Recurrent Neural Networks (RNNs), Deep Neural Networks (DNNs) and so on.

However, the existing network models obtained by performing learning using Softmax loss function $L_{softmax}$ cannot achieve a satisfactory effect for training samples with relatively high learning discrimination, and thus it is necessary to improve loss function $L_{softmax}$ to guide a network model to perform learning, such that a distance between training samples belonging to a same class in the vector space is reduced and such that a distance between training samples belonging to different classes in the vector space is increased.

Therefore, the present disclosure proposes an information processing technology for performing training on a classification model by using a plurality of training samples. The technology according to the present disclosure first performs preprocessing on the training samples before performing the training on the training samples, so as to guide learning of the classification model, thereby achieving the technical effect of reducing an intra-class distance and increasing an intra-class distance.

Embodiments of the present disclosure will be described in more details combined with the drawings below.

First Embodiment

Figure 1:
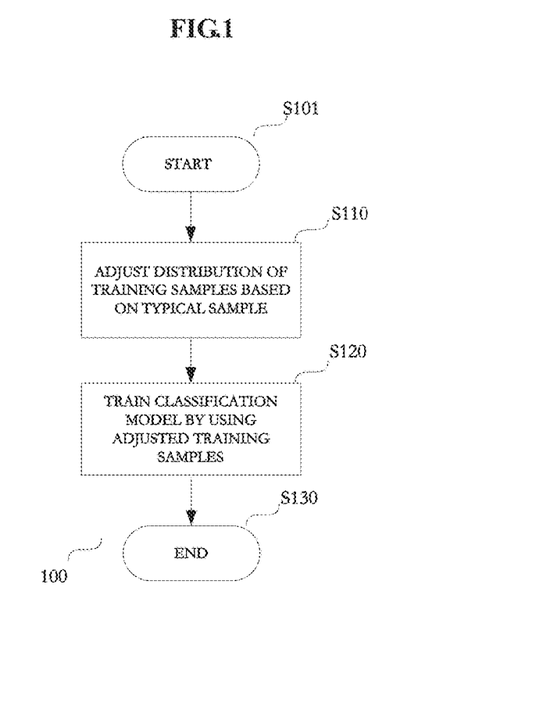
FIG. 1 is a flowchart showing an information processing method according to a first embodiment of the present disclosure.

FIG. 1 is a flowchart showing an information processing method 100 according to a first embodiment of the present disclosure.

The information processing method 100 according to the first embodiment of the present disclosure performs training on a classification model by using a plurality of training samples. As shown in FIG. 1, the information processing method 100 starts at step S101. Subsequently, in step S110, a distribution of feature vectors of the plurality of training samples in a feature space is adjusted based on a typical sample in the plurality of training samples. Next, in step S120, training is performed on the classification model by using the adjusted feature vectors of the plurality of training samples. Finally, the information processing method 100 ends at step S130.

The idea of embodiments of the present disclosure lies in adding a constraint condition for training samples before training, so as to enhance discriminativity between training samples of different classes.

According to an embodiment of the present disclosure, the operation of adjusting the distribution of the feature vectors in the feature space in the step S110 is performed by: selecting a training sample having a most typical feature of a class from among training samples belonging to a same class among the plurality of training samples, as a typical sample of the class; and causing feature vectors of other training samples other than the typical sample to aggregate towards a feature vector of the typical sample. The purpose of the operation is reducing discrimination between training samples belonging to a same class and increasing discrimination between training samples belonging to different classes, before performing the training on the classification model by using the plurality of training samples.

According to an embodiment of the present disclosure, the most typical feature of the class causes the classification model not to classify the typical sample into another class.

For example, when training samples are face images and are used for performing training on a face recognition model serving as a classification model, for face images belonging to a same person (i.e., training samples belonging to a same class), a face image captured in a standard environment, for example under a condition where a color contrast of the background is obvious, illumination intensity is uniform and appropriate, a face right faces a camera lens and has no deviation and the like, may be taken as the typical sample. That is, the face recognition model will not classify the face image as the typical sample to belong to other persons.

Figure 2A:
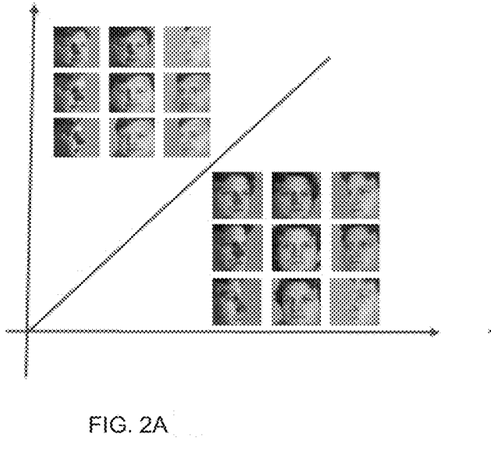
FIG. 2A and FIG. 2B are schematic views showing examples of taking face images as training samples.
Figure 2B:
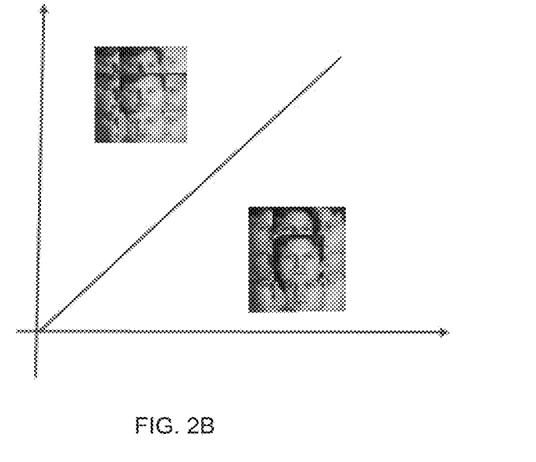

FIG. 2A and FIG. 2B are schematic views showing examples of taking face images as training samples, wherein FIG. 2A shows a schematic view of training samples which have not been subjected to the processing in the step S110, and FIG. 2B shows a schematic view of training samples which have been subjected to the processing in the step S110.

The abscissas and ordinates in FIG. 2A and FIG. 2B represent classes, respectively. In the cases as shown in FIG. 2A and FIG. 2B, face images are taken as training samples, and belong to different classes, that is, belong to different persons. As shown in FIG. 2A, a distance between face images (training samples) belonging to different persons (classes) is not great, and thus discrimination between them is not obvious. In this case, a face recognition model obtained through training using the training samples which have not been subjected to the processing cannot achieve an excellent classification effect with respect to a sample obtained under an extreme case, for example in a case where a background color is close to a face color, illumination rays are dark and a face deviates from a camera lens and the like.

When the information processing method 100 according to the first embodiment of the present disclosure is applied, through the processing in the step S110, i.e., by taking a front face image captured in a case where a color contrast of the background is obvious and an illumination condition is ideal as the typical sample of the class (person), and adjusting a distribution of feature vectors of other training samples (face images) in the feature space, the feature vectors of the other training samples are caused to aggregate towards a feature vector of the typical sample, so as to reduce discrimination between training samples belonging to a same class and increase discrimination between training samples belonging to different classes.

According to an embodiment of the present disclosure, the processing in the step S110 may be implemented by: normalizing distances between the feature vectors of the other training samples and the feature vector of the typical sample by taking the feature vector of the typical sample as a center.

The step S110 of the information processing method 100 according to the first embodiment of the present disclosure will be described in combination with loss function $L_{softmax}$ below.

Based on the operation in the step S110 of the information processing method 100, the loss function $L_{softmax}$ in the equation (2) could be modified into the following equation (3).

$$L_{soft\ max} = \frac{1}{N}\sum_{i=1}^{N}\log\left(\frac{e^{\|w_{y_i}^T\|\beta\cos(\theta_{y_i,i})+b_{y_i}}}{\sum_{j=1}^{C}e^{\|w_j^T\|\beta\cos(\theta_{j,i})+b_j}}\right) \quad \text{Equation (3)}$$

Training samples $x_i$ belonging to a same class are normalized relative to the typical sample, i.e., $\|x_i\|=\beta$, where $\beta$ is a constant. Through such processing, in the feature space, it is possible to cause feature vectors of other training samples other than the typical sample to aggregate towards a feature vector of the typical sample, such that discrimination between training samples belonging to a same class is reduced and discrimination between training samples belonging to different training samples is increased.

Subsequently, as stated above, in the step S120, the information processing method 100 performs training on the classification model by using the adjusted feature vectors of the plurality of training samples, so as to obtain a final trained classification model By the information processing method 100, it is possible to perform pre-adjustment on the training samples before the training, such that it is possible to reduce discrimination between training samples belonging to a same class and increase discrimination between training samples belonging to different classes in the training process. The classification model trained as such is capable of performing accurate classification on samples acquired under an extreme condition.

Second Embodiment

According to the present disclosure, in addition to performing preprocessing on training samples before training, it is also possible to perform preprocessing on a classification model itself.

Figure 3:
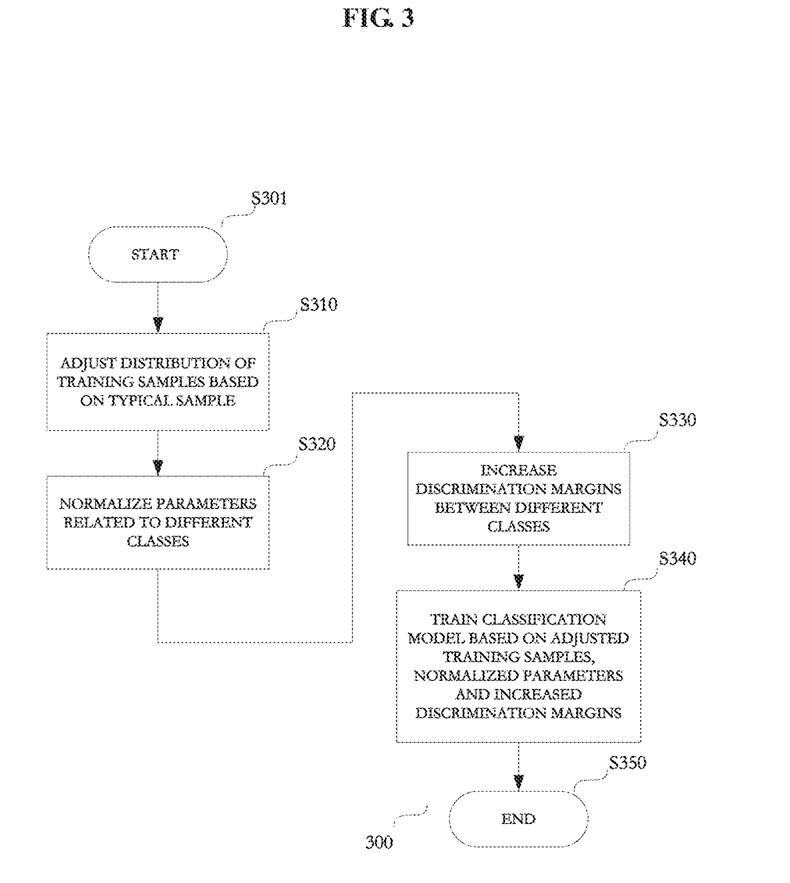
FIG. 3 is a flowchart showing an information processing method according to a second embodiment of the present disclosure.

FIG. 3 is a flowchart showing an information processing method 300 according to a second embodiment of the present disclosure.

As shown in FIG. 3, the information processing method 300 starts at step S301. Subsequently, step S310 is performed. The step S310 in FIG. 3 is completely the same as the step S110 in FIG. 1, and thus no repeated description will be made in regard to this step for the sake of conciseness.

Referring to FIG. 3, according to the second embodiment of the present disclosure, the information processing method 300 can further comprise step S320, in which parameters of the classification model which are related to different classes are normalized, to perform training on the classification model based on the adjusted feature vectors of the plurality of training samples and the normalized parameters.

As shown in the above equations (1) to (3), the weight vector $W_j$ may be understood as an axis starting from the origin in the vector space. Therefore, in the vector space, there exist C axes intersecting at the origin, which respectively correspond to C classes and simultaneously correspond to C weight vectors $W_j$. Feature vectors of training samples belonging to a same class aggregate near the corresponding weight vectors $W_j$.

In other words, for each class, the classification model can have parameters corresponding to the class, such as a weight vector $W_j$ and a corresponding bias value $b_j$.

By normalizing the weight vector $W_j$, it is possible to project the weight vector $W_j$ onto a same sphere in the vector space. Through the processing in the step S320, it is possible to eliminate influences of a modulus of the weight vector $W_j$ upon the classification model, so as to obtain a more strict classification standard.

Based on the operation in the step S320, the loss function $L_{softmax}$ in the equation (3) could be further modified into the following equation (4).

$$L_{soft\,max} = \frac{1}{N}\sum_{i=1}^{N} \log\left(\frac{e^{\alpha\beta \cos(\theta_{y_i},i)+b_{y_i}}}{\sum_{j=1}^{C} e^{\alpha\beta \cos(\theta_{j,i})+b_j}}\right) \quad \text{Equation (4)}$$

Where the weight vector $W_j$ is normalized, that is, $\|W_j\|=\alpha$, where $\alpha$ is a constant.

In addition, referring to FIG. 3, according to the second embodiment of the present disclosure, the information processing method 300 can further comprise step S330, in which discrimination margins between different classes to which the plurality of training samples belong are increased, to perform training on the classification model based on the adjusted feature vectors of the plurality of training samples and the increased discrimination margins.

The purpose of the processing in the step S330 is also reducing discrimination between training samples belonging to a same class and increasing discrimination between training samples belonging to different classes.

To be specific, according to an embodiment of the present disclosure, the increasing discrimination margins may be performed by: for each training sample in the plurality of the training samples, adjusting a similarity degree between the training sample and a parameter of a corresponding class. As stated above, to reduce discrimination between training samples belonging to a same class, it is possible to adjust a similarity degree between the training sample and a parameter of a corresponding class, i.e., to adjust a similarity between the training sample vector $x_i$ and the corresponding weight vector $W_{yi}$.

To be more specific, according to an embodiment of the present disclosure, the adjusting a similarity degree can comprise: multiplying an angle between a feature vector of the training sample and a feature vector of a corresponding parameter of the classification model by a coefficient m, where m>1. In other words, for the training sample vector $x_i$ and the corresponding weight vector $W_{yi}$, it is possible to increase a similarity degree therebetween by reducing an included angle between the two vectors.

Description will be made based on loss function $L_{softmax}$ below.

Based on the operation in the step S330 described above, the loss function $L_{softmax}$ in the equation (4) could be further modified into the following equation (5).

$$L_{soft\,max} = \frac{1}{N}\sum_{i=1}^{N} \log\left(\frac{e^{\alpha\beta\varphi(\theta_{y_i},i)+b_{y_i}}}{\sum_{j=1}^{C} e^{\alpha\beta\varphi(\theta_{y_i},i)+b_j} + \sum_{j\neq y_i}^{C} e^{\alpha\beta \cos(\theta_{y_i},i)+b_j}}\right) \quad \text{Equation (5)}$$

Where $\varphi(\theta_{y_i}, i) = (-1)^k \cos(m\theta_{y_i,i}) - 2k$, $$\theta_{y_i,i} \in \left[\frac{k\pi}{m}, \frac{(k+1)\pi}{m}\right], \text{ and } k \in [0, m-1], m \geq 1.$$

That is, by introducing m ($\geq 1$), it is possible to reduce discrimination between training samples belonging to a same class and increase discrimination between training samples belonging to different classes. In other words, by introducing the coefficient m ($\geq 1$), it is possible to increase discrimination margins between different classes to which the plurality of training samples belong.

The coefficient m may be selected based on various principles.

For example, according to an embodiment of the present disclosure, the coefficient m may be selected such that a maximum angle feature distance within a same class is less than a minimum angle feature distance between different classes. That is, by introducing the coefficient m, a maximum value of included angles between feature vectors of all training samples belonging to a same class in the vector space is less than a minimum value of included angles between feature vectors of training samples belonging to different classes in the vector space, such that discrimination of the training samples belonging to the same class is relatively small and discrimination of the training samples belonging to the different classes is relatively large.

Moreover, according to an embodiment of the present disclosure, the coefficient m is reduced when the count C of the classes to which the plurality of training samples belong is increased; and the coefficient m is increased when the count C is reduced. As stated above, by increasing the coefficient m, it is possible to reduce included angles between feature vectors of training samples belonging to a same class in the vector space and to increase included angles between feature vectors of training samples belonging to different classes in the vector space. However, the coefficient m is related to the count C of the classes. To be specific, when the count C is relatively large, the value of the coefficient m cannot be excessively increased since the distribution of the weight vectors $W_j$ in the vector space is relatively dense. For the same reason, when the count is relatively small, the value of the coefficient m can be appropriately increased since the distribution of the weight vectors $W_j$ in the vector space is relatively sparse.

Subsequently, as shown in FIG. 3, in step S340, it is possible to perform training on the classification model based on the adjusted feature vectors of the plurality of training samples, the normalized parameters and the increased discrimination margins, to obtain a trained classification model. Finally, the information processing method 300 ends at step S350.

The classification model trained by the information processing method 300 is capable of performing accurate classification on samples acquired under an extreme condition.

Although the information processing method 300 has been described above in the order of the steps S310, S320, S330, those skilled in the art should appreciate that there exists no particular limitation to the execution order of the above steps. In other words, the steps S310, S320, S330 may be executed in any order or may be simultaneously executed, and all of these variant solutions should be covered within the scope of the present disclosure. Moreover, those skilled in the art should also appreciate that the steps S320 and S330 are not essential for the information processing method according to the embodiment of the present disclosure. In other words, it is possible to execute only the step S310 but not execute the steps S320 and S330, or it is possible to execute the step S310 and one of the steps S320 and S330.

To more intuitively describe the technology according to the present disclosure, interpretations of the respective steps of the information processing method 300 according to the present disclosure will be described in combination with FIG. 4A, FIG. 4B, FIG. 4C and FIG. 4D.

Figures 4A, 4B:
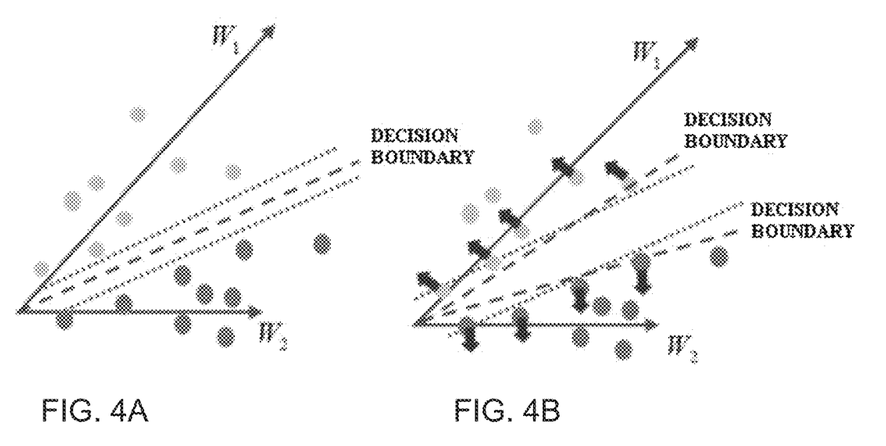
FIG. 4A, FIG. 4B, FIG. 4C and FIG. 4D are schematic views showing geometric interpretations of respective steps of the information processing method according to the second embodiment of the present disclosure.

FIG. 4A, FIG. 4B, FIG. 4C and FIG. 4D are schematic views showing geometric interpretations of the respective steps of the information processing method 300 according to the second embodiment of the present disclosure To be specific, FIG. 4A shows the case where no preprocessing is performed on the classification model and the training samples. As shown in FIG. 4A, for example, the training samples belong to two classes (represented by circular points in light color and circular points in dark color, respectively), projections of parameters such as weight vectors of the two classes in the vector space are $W_1$ and $W_2$, and a distribution of feature vectors of the training samples in the vector space is around the two weight vectors. To facilitate the understanding, FIG. 4A shows a boundary for deciding the classes.

FIG. 4B shows the case where preprocessing (the step S330) of increasing inter-class discrimination margins is performed on the classification model. As shown in FIG. 4B, by executing the step S330, the inter-class decision boundary is extended from a line into a sector and the training samples of the respective classes aggregate (represented by arrows in light color in the figure) towards the corresponding weight vectors, such that discrimination between training samples belonging to a same class is relatively small and discrimination between training samples belonging to different classes is relatively large.

Figures 4C, 4D:
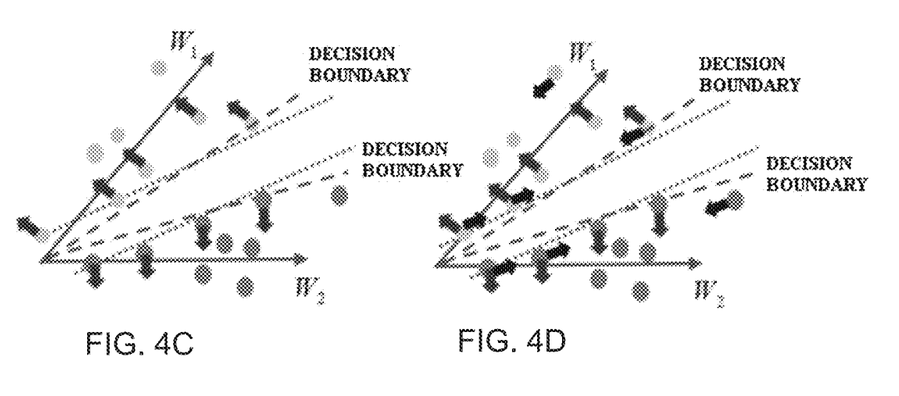

FIG. 4C shows the case where preprocessing (the step S320) of class parameter normalization is further performed on the classification model. As shown in FIG. 4C, by executing the step S320, the weight vectors $W_1$ and $W_2$ are normalized and thus are capable of being projected onto the same sphere in the vector space, thereby eliminating the influences of the moduli of the weight vectors upon the training process of the classification model, so as to obtain a more strict classification standard.

FIG. 4D shows the case where preprocessing (the step S110 or S310) of class parameter normalization is further performed on the classification model. As shown in FIG. 4C, by executing the step S110 or S310, training samples belonging to different classes aggregate (represented by arrows in light color in the figure) towards the corresponding typical samples respectively, such that discrimination between training samples belonging to a same class is relatively smaller and discrimination between training samples belonging to different classes is relatively larger.

The information processing method according to the present disclosure can perform pre-adjustment on the training samples and the classification model before training, such that it is possible to reduce discrimination between training samples belonging to a same class and increase discrimination between training samples belonging to different classes in the training process. The classification model trained as such is capable of performing accurate classification on samples acquired under an extreme condition.

Figure 5:
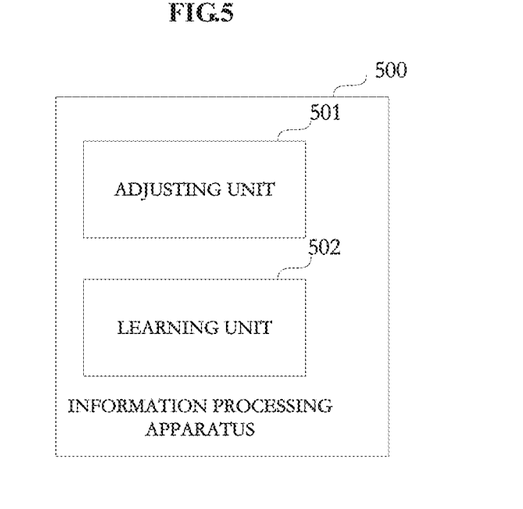
FIG. 5 is a block diagram showing an information processing apparatus according to an embodiment of the present disclosure.

FIG. 5 is a block diagram showing an information processing apparatus 500 according to an embodiment of the present disclosure.

As shown in FIG. 5, the information processing apparatus 500 for performing training on a classification model by using a plurality of training samples comprises: an adjusting unit 501 to adjust a distribution of feature vectors of the plurality of training samples in a feature space based on a typical sample in the plurality of training samples; and learning unit 502 to perform training on the classification model by using the adjusted feature vectors of the plurality of training samples.

The adjusting unit 501 is configured to perform the processing in the step S110 of the method 100 described above with reference to FIG. 1 or the step S310 of the method 300 described above with reference to FIG. 3 and can gain the benefits related to the processing, and descriptions thereof are omitted here.

The learning unit 502 is configured to perform the processing in the step S120 of the method 100 described above with reference to FIG. 1 or the step S340 of the method 300 described above with reference to FIG. 3 and can gain the benefits related to the processing, and descriptions thereof are omitted here.

In addition, the present disclosure further proposes an information processing method, which detects data to be detected, by using a classification model obtained by performing training by the information processing methods as described above. By performing training by the information processing methods as described above, it is possible to acquire a classification model having a better classification effect for samples acquired under an extreme condition, and to use the classification model to perform classification on unlabeled samples (i.e., the data to be detected).

Figure 6:
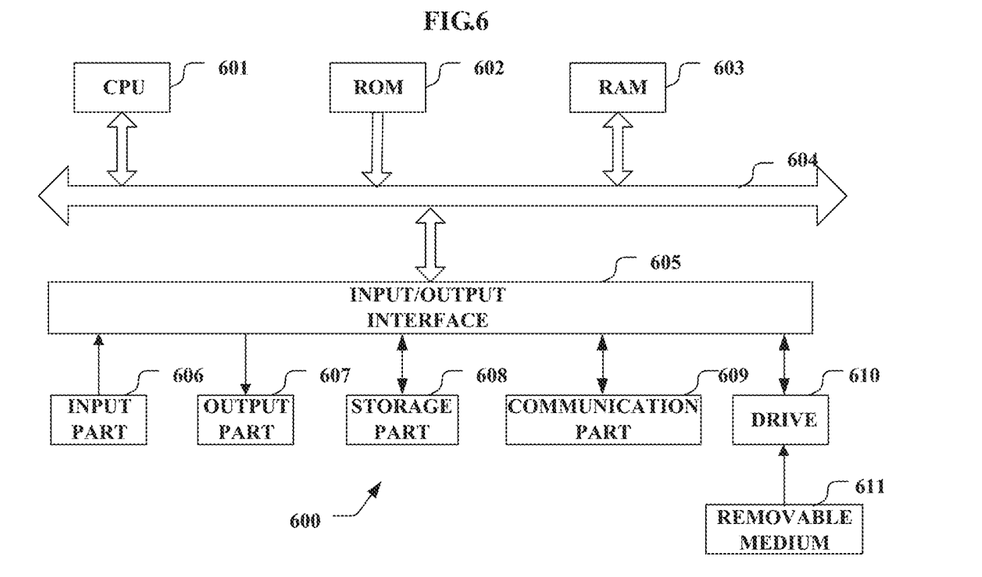
FIG. 6 is a structure diagram of a general-purpose machine 600 that can be used to realize the information processing methods 100, 300 and the information processing apparatus 500 which perform training on a classification model by using a plurality of training samples according to the embodiments of the present disclosure.

FIG. 6 is a structure diagram of a general-purpose machine 600 that can be used to realize the information processing methods 100, 300 and the information processing apparatus 500 which perform training on a classification model by using a plurality of training samples according to the embodiments of the present disclosure. It should be noted that, the general-purpose machine 600 is only an example, but does not imply a limitation to the use range or function of the methods and apparatus of the present disclosure. The general-purpose machine 600 should also not be construed to have a dependency on or a demand for any assembly or combination thereof as shown in the above methods and apparatus which perform training on a classification model by using a plurality of training samples.

In FIG. 6, a central processing unit (CPU) 601 performs various processing according to programs stored in a read-only memory (ROM) 602 or programs loaded from a storage part 608 to a random access memory (RAM) 603. In the RAM 603, data needed when the CPU 601 performs various processes and the like is also stored, as needed. The CPU 601, the ROM 602 and the RAM 603 are connected to each other via a bus 604. An input/output interface 605 is also connected to the bus 604.

The following components are connected to the input/output interface 605: an input part 606 (including keyboard, mouse and the like), an output part 607 (including display such as cathode ray tube (CRT), liquid crystal display (LCD) and the like, and loudspeaker and the like), a storage part 608 (including hard disc and the like), and a communication part 609 (including network interface card such as LAN card, modem and the like). The communication part 609 performs communication processing via a network such as the Internet. A driver 610 may also be connected to the input/output interface 605, as needed. As needed, a removable medium 611, such as a magnetic disc, an optical disc, a magnetic optical disc, a semiconductor memory and the like, may be installed in the driver 610, such that a computer program read therefrom is installed in the memory part 608 as needed.

In the case where the foregoing series of processing is implemented through software, programs constituting the software are installed from a network such as the Internet or a memory medium such as the removable medium 611.

It should be understood by those skilled in the art that, such a memory medium is not limited to the removable mediums 611 as shown in FIG. 6 in which programs are stored and which are distributed separately from the apparatus to provide the programs to users. Examples of the removable medium 611 include a magnetic disc (including floppy disc (registered trademark)), a compact disc (including compact disc read-only memory (CD-ROM) and digital video disk (DVD)), a magnetic optical disc (including mini disc (MD) (registered trademark)), and a semiconductor memory. Alternatively, the memory mediums may be hard discs included in the ROM 602 and the memory part 608, in which programs are stored and which are distributed together with the apparatus containing them to users.

In addition, the present disclosure further proposes a program product having stored thereon machine-readable instruction codes that, when read and executed by a machine, can implement the above information processing method according to the present disclosure which performs training on a classification model by using a plurality of training samples. Accordingly, the various storage media for carrying such a program product which are enumerated above are also included within the scope of the present disclosure.

Detailed descriptions have been made above by means of block diagrams, flowcharts and/or embodiments, to describe specific embodiments of the apparatus and/or methods according to the embodiments of the present application. When these block diagrams, flowcharts and/or embodiments include one or more functions and/or operations, those skilled in the art appreciate that the various functions and/or operations in these block diagrams, flowcharts and/or embodiments may be implemented individually and/or jointly through various hardware, software, firmware or essentially any combination thereof. In an embodiment, several parts of the subject matter described in the present specification may be realized by an Application Specific Integrated Circuit (ASIC), a Field-Programmable Gate Array (FPGA), a Digital Signal Processor (DSP) or other integrations. However, those skilled in the art would appreciate that, some aspects of the embodiments described in the present specification may, completely or partially, be equivalently implemented in the form of one or more computer programs running on one or more computers (e.g., in the form of one or more computer programs running on one or more computer systems), in the form of one or more computer programs running on one or more processors (e.g., in the form of one or more computer programs running on one or more microprocessors), in the form of firmware, or in the form of essentially any combination thereof; moreover, according to the disclosure of the present specification, designing circuitry used for the present disclosure and/or compiling codes of software and/or firmware used for the present application are completely within the range of the capability of those skilled in the art.

It should be emphasized that the term "comprise/include", as used herein, refers to the presence of a feature, an element, a step or an assembly but does not preclude the presence or addition of one or more other features, elements, steps or assemblies. The term "first", "second" and the like relating to ordinal numbers does not represent an implementation sequence or importance degree of features, elements, steps or assemblies defined by these terms, but is only used to perform identification among these features, elements, steps or assemblies for the sake of clarity of descriptions.

In conclusion, in the embodiments of the present disclosure, the present disclosure provides the following solutions but is not limit hereto:

Solution 1. An information processing method, which performs training on a classification model by using a plurality of training samples, the method comprising:

adjusting a distribution of feature vectors of the plurality of training samples in a feature space based on a typical sample in the plurality of training samples; and performing training on the classification model by using the adjusted feature vectors of the plurality of training samples.

Solution 2. The information processing method according to solution 1, wherein the typical sample is a training sample having a most typical feature of a class, the adjusting comprising:

causing feature vectors of other training samples other than the typical sample to aggregate towards a feature vector of the typical sample.

Solution 3: The information processing method according to solution 2, wherein the most typical feature of the class causes the classification model not to classify the typical sample into another class.

Solution 4. The information processing method according to solution 2, wherein the aggregating comprises:

normalizing distances between the feature vectors of the other training samples and the feature vector of the typical sample by taking the feature vector of the typical sample as a center.

Solution 5. The information processing method according to solution 1, wherein for each class, the classification model has a parameter corresponding to the class, the method further comprising:

normalizing parameters of the classification model which are related to different classes, to perform training on the classification model based on the adjusted feature vectors of the plurality of training samples and the normalized parameters.

Solution 6. The information processing method according to solution 1, further comprising:

increasing discrimination margins between different classes to which the plurality of training samples belong, to perform training on the classification model based on the adjusted feature vectors of the plurality of training samples and the increased discrimination margins.

Solution 7. The information processing method according to solution 6, wherein the increasing discrimination margins comprises:

for each training sample in the plurality of the training samples, adjusting a similarity degree between the training sample and a parameter of a corresponding class.

Solution 8. The information processing method according to solution 7, wherein the adjusting a similarity degree comprises: multiplying an angle between a feature vector of the training sample and a feature vector of a corresponding parameter of the classification model by a coefficient m, where m>1.

Solution 9. The information processing method according to solution 8, wherein the coefficient m is selected such that a maximum angle feature distance within a same class is less than a minimum angle feature distance between different classes.

Solution 10. The information processing method according to solution 8, wherein the coefficient m is reduced when the count of the classes to which the plurality of training samples belong is increased; and the coefficient m is increased when the count is reduced.

Solution 11. The information processing method according to solution 1, wherein the classification model is Softmax function, the parameters are weights of Softmax function with respect to different classes, the training samples are inputs used in a training process using Softmax function.

Solution 12. An information processing apparatus, which performs training on a classification model by using a plurality of training samples, the apparatus comprising:

an adjusting unit to adjust a distribution of feature vectors of the plurality of training samples in a feature space based on a typical sample in the plurality of training samples; and a learning unit to perform training on the classification model by using the adjusted feature vectors of the plurality of training samples.

Solution 13. An information processing method, comprising detecting data to be detected, by using a classification model obtained by performing training by the information processing methods according to solutions 1 to 11.

While the present disclosure has been described above with reference to the descriptions of the specific embodiments of the present disclosure, it should be understood that those skilled in the art could carry out various modifications, improvements or equivalents on the present disclosure within the spirit and scope of the appended claims. The modifications, improvements or equivalents should also be considered as being included in the scope of protection of the present disclosure.

The invention claimed is:

1. An information processing method by a network of computer implemented processes to perform training on a classification model by using a plurality of training samples, the method comprising:

adjusting a distribution of feature vectors of the plurality of training samples in a feature space based on a typical sample in the plurality of training samples; and performing training on the classification model by using the adjusted feature vectors of the plurality of training samples, wherein, the typical sample is a training sample having a most typical feature of a class in the classification model, the most typical feature of the class is to cause the classification model not to classify the typical sample into another class, and the adjusting includes causing feature vectors of other training samples other than the typical sample to aggregate towards a feature vector of the typical sample.

2. The information processing method according to claim 1, wherein to aggregate towards the target feature vector comprises:

normalizing distances between the feature vectors of the other training samples and the feature vector of the typical sample by taking the feature vector of the typical sample as a center.

3. The information processing method according to claim 1, wherein for each class in the classification model, the classification model has a parameter corresponding to the class, the method further comprising:

normalizing parameters of the classification model which are related to different classes, to perform training on the classification model based on the adjusted feature vectors of the plurality of training samples and the normalized parameters.

4. The information processing method according to claim 1, further comprising:

increasing discrimination margins between different classes in the classification model to which the plurality of training samples belong, to perform training on the classification model based on the adjusted feature vectors of the plurality of training samples and the increased discrimination margins.

5. The information processing method according to claim 4, wherein the increasing discrimination margins comprises:

for each training sample in the plurality of the training samples, adjusting a similarity degree between the training sample and a parameter of a corresponding class.

6. The information processing method according to claim 5, wherein the adjusting a similarity degree comprises:

multiplying an angle between a feature vector of the training sample and a feature vector of a corresponding parameter of the classification model by a coefficient m, where m>1.

7. An information processing apparatus comprising a processor coupled to a memory and to detect data to be detected, by using a classification model obtained by performing training of the classification model using a plurality of training samples in a feature space according to claim 1.

8. An information processing apparatus, which performs training on a classification model by using a plurality of training samples, the apparatus comprising:

a processor coupled to a memory and to,
   adjust a distribution of feature vectors of the plurality of training samples in a feature space based on a typical sample in the plurality of training samples; and
   perform training on the classification model by using the adjusted feature vectors of the plurality of training samples,
   wherein,
      the typical sample is a training sample having a most typical feature of a class in the classification model, the most typical feature of the class is to cause the classification model not to classify the typical sample into another class, and
      to adjust the distribution includes causing feature vectors of other training samples other than the typical sample to aggregate towards a feature vector of the typical sample.

9. An information processing method by a computer, comprising:
   detecting data to be detected, by using a classification model obtained by performing training of the classification model using a plurality of training samples by,
      adjusting a distribution of feature vectors of the plurality of training samples in the feature space based on a typical sample in the plurality of training samples; and
      performing training on the classification model by using the adjusted feature vectors of the plurality of training samples,
   wherein
      the typical sample is a training sample having a most typical feature of a class in the classification model, the most typical feature of the class is to cause the classification model not to classify the typical sample into another class, and
      the adjusting includes causing feature vectors of other training samples other than the typical sample to aggregate towards a feature vector of the typical sample.

10. The method according to claim 9, wherein to aggregate towards the target feature vector comprises:
   normalizing distances between the feature vectors of the other training samples and the feature vector of the typical sample by taking the feature vector of the typical sample as a center.

\* \* \* \* \*